United States Patent [19]

Perl

[11] Patent Number: 4,911,269
[45] Date of Patent: Mar. 27, 1990

[54] TWIN WHEEL CASTER WITH INTEGRAL BRAKE ASSEMBLY

[75] Inventor: Ludovic A. Perl, Willowdale, Canada
[73] Assignee: Shepherd Products Limited, Markham, Canada
[21] Appl. No.: 279,933
[22] Filed: Dec. 2, 1988
[51] Int. Cl.⁴ .................... B60T 1/06; B60B 33/00
[52] U.S. Cl. .................... 188/1.12; 16/35 R; 188/31; 188/69
[58] Field of Search ............ 188/31, 69, 74, 1.12; 16/35 R

[56] References Cited

U.S. PATENT DOCUMENTS

| | | | |
|---|---|---|---|
| 4,333,207 | 6/1982 | Atwood | 188/1.12 X |
| 4,664,231 | 5/1987 | James | 16/35 R X |
| 4,681,192 | 7/1987 | James | 188/1.12 |
| 4,720,893 | 1/1988 | Mellwig et al. | 16/35 R |

FOREIGN PATENT DOCUMENTS 3429834 2/1986 Fed. Rep. of Germany ..... 16/35 R

Primary Examiner—George E. A. Halvosa
Attorney, Agent, or Firm—Lee, Mann, Smith, McWilliams & Sweeney

[57] ABSTRACT

A twin wheel caster with a brake assembly formed as an integral part of the caster housing. The housing has a central body defining a notch therein and a resilient braking arm integrally formed with and extending downwardly from the central body movable between an unlocked position, whereby the caster wheels are permitted to rotate, and a locked position, whereby the wheels are prevented from rotating.

5 Claims, 1 Drawing Sheet

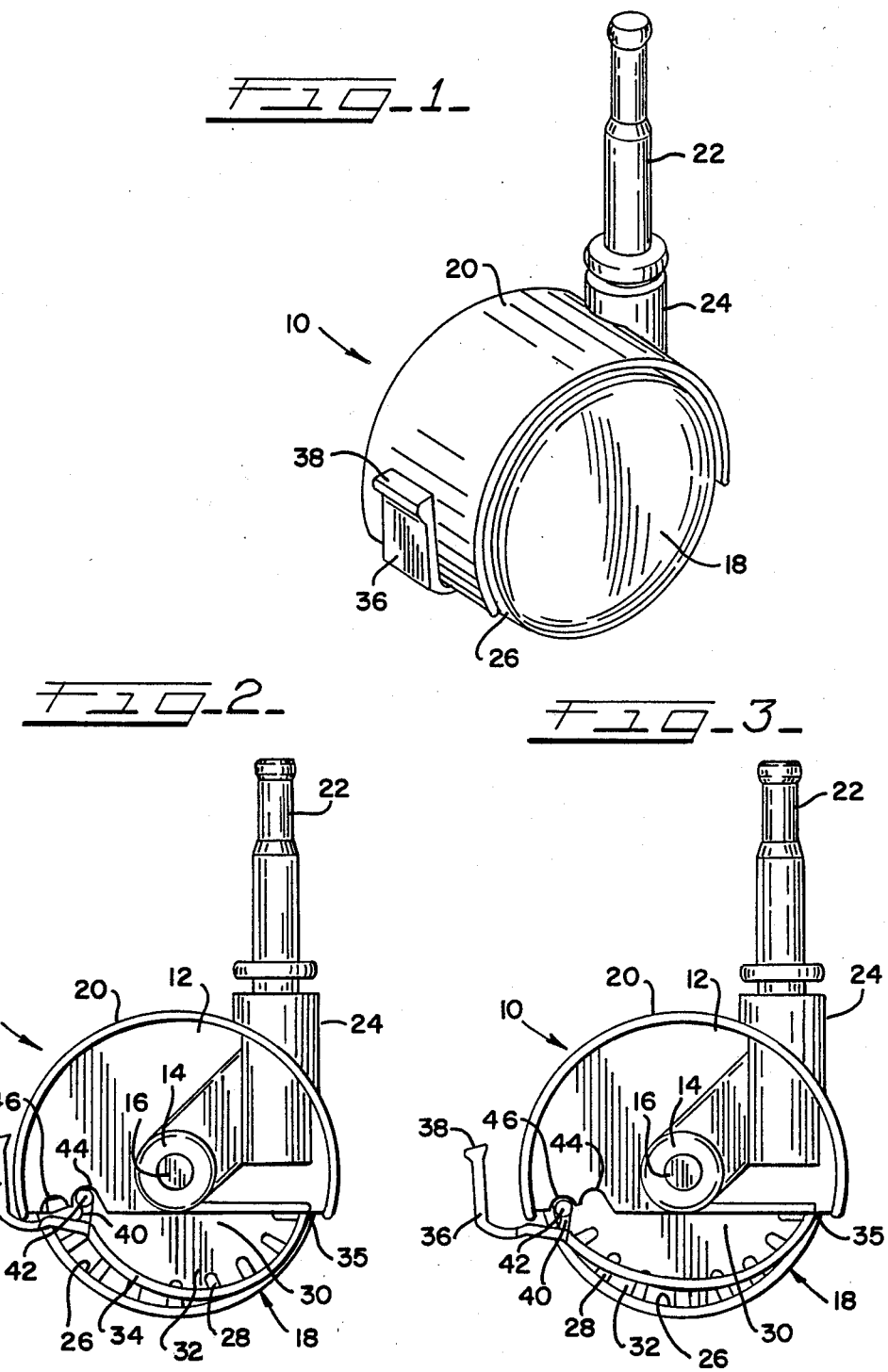

TWIN WHEEL CASTER WITH INTEGRAL BRAKE ASSEMBLY

BACKGROUND OF THE INVENTION

The present invention is directed to a caster and brake assembly. Numerous arrangements of this general type are shown in the prior art patents 4,110,866, 4,333,207, 4,479,566, 4,550,808 and 4,669,580. None of these patents utilizes a resilient braking element which is integral to and singularly constructed with the caster housing.

SUMMARY OF THE INVENTION

The present invention provides a twin wheel caster in which a brake assembly is formed integral with the caster housing. The caster housing has a central body defining a central hub. An axle is mounted through the central hub and receives a caster wheel on each end thereof. Each wheel defines a plurality of radially inwardly extending ribs defining recesses therebetween. A resilient braking arm is integrally formed with and extends downwardly from the central body. One end of the braking element is integrally hingedly connected to the central body and the other end is free to pivot about the hinged connection and is provided with an actuating member. A locking bar is connected to the braking arm and defines a pair of outwardly extending arms. A notch is defined in the central body. The locking bar is movable, via the actuating member, between an unlocked position, whereby the locking bar is out of contact with the recesses between the wheel ribs thereby permitting the wheels to rotate freely, and a locked position, whereby the ends of the locking bar are disposed in the recesses between the wheel ribs, thereby preventing the wheels from rotating. The caster housing, braking arm and locking bar are cast or molded as an integral unit thereby eliminating the expense of assembly of these elements.

BRIEF DESCRIPTION OF THE DRAWINGS

FIG. 1 shows a perspective view of the caster and brake assembly of the present invention.

FIG. 2 is a side view, with one wheel removed, of the caster and brake assembly of the present invention in the unlocked position.

FIG. 3 is a side view, with one wheel removed, of the caster and brake assembly of the present invention in the locked position.

DETAILED DESCRIPTION OF THE INVENTION

A twin wheel caster and brake assembly is shown in FIG. 1. The caster includes a caster housing, generally designated by the numeral 10, which includes a central body 12. The central body 12 defines a hub 14 through which an axle 16 is mounted. The axle 16 extends outwardly from both sides of the body 12 and a caster wheel 18 is mounted on each end of the axle 16. A wheel cover 20 is integrally formed with the central body 12 and extends outwardly therefrom so as to overlie the wheels 18. One end of a pintle 22 is mounted in a socket 24 formed in the caster housing 10. The other end of the pintle 22 is adapted to be inserted into a chair base or leg.

Each wheel 18 defines about its outer periphery an inwardly extending rim 26. A plurality of ribs 28 are formed on the rim 26 and extend radially inwardly from the rim 26 toward the hub 14. Each pair of adjacent ribs 28 defines therebetween a recess 32.

A generally arcuate-shaped, resilient braking arm 34 is integrally formed with the central body 12 and extends downwardly therefrom. The inner end of the braking element 34 is integrally, hingedly connected at 35 to the central body 12. The arm is free to pivot about the hinged connection 35. The free end of the braking arm 34 extends outside of the caster housing and defines an actuating member 36 which extends beneath a lower edge of the wheel cover 20 and is bent upwardly so that it is positioned adjacent the outer surface of the wheel cover 20. The end of the actuating member 36 is provided with a land 38 to assist in moving the braking arm 34 between an unlocked and a locked position, as will be described below.

An integral locking bar 40 extends upwardly from the braking element 34. The locking bar 40 is generally T-shaped defining outwardly extending arms 42 adapted to cooperate with the recesses 32 formed between the ribs 28.

A first notch 44, adapted to receive the locking bar 40 in its unlocked position, is defined in the central body 12. In the preferred embodiment, a second notch 46, adapted to receive the locking bar 40 in its locking position, is defined adjacent and outwardly of the first notch 44.

The central body 12, central hub 14, wheel cover 20, braking arm 34, actuating member 36 and locking bar 40 are cast or molded as a singular, integral construction of any suitable plastic or rubber material. There are no small parts or springs, which may break or come apart and require replacement. No time consuming assembly of brake parts is required. The only assembly required of the unit is insertion of the axle 16 within the hub 14 and installation of the wheels 18. Production and manufacture of the caster is significantly simplified and substantial savings in labor and cost result.

FIG. 2 illustrates the caster and brake assembly in the unlocked position. The locking bar 40 is engaged in the first notch 44. The ends 42 are maintained out of contact with the recess 32 and ribs 28, so that the wheels 18 are permitted to freely rotate. The notch is formed so that the pressure exerted by the flexed arm 34 maintains the bar 40 in the unlocked position.

When it is desired to lock the caster, as shown in FIG. 3, the actuating member 36 is manually actuated by pressing downwardly on the land 38 with a foot or thumb. This disengages the locking bar 40 from the first notch 44 and causes the arm 34 to move outwardly. The locking bar 40 engages within the second notch 46. At the same time, the arms 42 locate in a recess 32 between a pair of ribs 28, as seen in FIG. 3. This prevents the wheels 18 from rotating.

To unlock the caster, the actuating member 36 is moved inwardly and upwardly again to the position shown in FIG. 2. While a second notch 46 is shown, it is not necessary, although it is preferred. Even if no second notch 46 were provided, the locking bar arms 42 would still engage recesses 32 between pairs of ribs 28 to prevent the wheels 18 from rotating and lock the caster. The second notch 46 provides additional support for the locking bar 40.

Thus it has been shown that the present invention provides an inexpensive and economical caster and brake assembly wherein the braking and activating parts are formed integral to the caster housing which eliminate substantial time and expense in assembly.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A twin wheel caster and integral brake assembly including a caster housing including a central body defining a hub, an axle mounted through said hub and extending outwardly from opposite sides of said central body, a pair of wheels, one mounted on each end of said axle, each wheel defining a plurality of radially inwardly extending ribs on an inner face thereof, each pair of adjacent ribs defining a recess therebetween, a resilient arm integrally formed with and extending downwardly from said central body, one ed of said arm integrally hingedly connected to said central body and the other end extending outwardly of said caster housing, a locking bar connected to and extending from said arm, said locking bar movable between a locked position, in which the ends of said locking bar are engaged within said recesses between said ribs and an unlocked position in which said ends of said locking bar are out of contact with said ribs, an actuating member integrally formed at said end of said arm disposed outwardly of said housing, to move said arm and said locking bar between said locked and unlocked positions, a first notch defined in said central body, adapted to receive therein said locking bar and to maintain said locking bar in said unlocked position whereby said locking bar is prevented from engaging said recesses thereby permitting free rotation of said wheels.

2. The twin wheel caster and integral brake assembly of claim 1 including a wheel cover integrally formed with and extending radially outwardly from said central body so as to overlie said wheels.

3. The twin wheel caster and integral brake assembly of claim 2 wherein said actuating member extends beneath a lower edge of said wheel cover and upwardly adjacent an outer surface of said wheel cover.

4. The twin wheel caster and integral brake assembly of claim 2 wherein said central body, said hub, said wheel cover, said arm, said lock bar and said actuating member are of singular, integral construction.

5. The twin wheel caster and integral brake assembly of claim 1 including a second notch defined in said central body adjacent and spaced outwardly of said first notch, said second notch adapted to receive therein said locking bar when said locking bar is in said locked position, engaged between said recesses of said wheels thereby preventing rotation of said wheels.

* * * * *